United States Patent
Park

(10) Patent No.: US 12,090,996 B2
(45) Date of Patent: Sep. 17, 2024

(54) DEVICE AND METHOD FOR CONTROLLING AUTONOMOUS DRIVING

(71) Applicants: HYUNDAI MOTOR COMPANY, Seoul (KR); KIA MOTORS CORPORATION, Seoul (KR)

(72) Inventor: Ji Hwan Park, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 150 days.

(21) Appl. No.: 17/094,519

(22) Filed: Nov. 10, 2020

(65) Prior Publication Data
US 2022/0024451 A1 Jan. 27, 2022

(30) Foreign Application Priority Data
Jul. 27, 2020 (KR) .................. 10-2020-0093290

(51) Int. Cl.
*B60W 30/09* (2012.01)
*B60Q 1/46* (2006.01)
(Continued)

(52) U.S. Cl.
CPC .............. *B60W 30/09* (2013.01); *B60Q 1/46* (2013.01); *B60R 21/01504* (2014.10);
(Continued)

(58) Field of Classification Search
CPC .................. B60W 30/08; B60W 30/09; B60W 60/0015; B60W 30/0956; B60W 60/0016;
(Continued)

(56) References Cited

U.S. PATENT DOCUMENTS

| 7,224,263 | B2 * | 5/2007 | Maehara | B60R 25/104 340/426.25 |
| 7,441,624 | B2 | 10/2008 | Tobata | |
| 8,917,519 | B2 * | 12/2014 | Sano | H05K 5/0013 206/706 |

(Continued)

FOREIGN PATENT DOCUMENTS

| DE | 102012224451 A1 | 7/2014 |
| EP | 1527959 A1 | 5/2005 |
| WO | WO2017160274 A1 | 9/2017 |

OTHER PUBLICATIONS

European Search Report for European Application No. EP 20 20 6395 dated Apr. 1, 2021 (12 pages).

*Primary Examiner* — Khoi H Tran
*Assistant Examiner* — Christopher Scott
(74) *Attorney, Agent, or Firm* — MORGAN, LEWIS & BOCKIUS LLP

(57) ABSTRACT

A device and a method for controlling autonomous driving are provided The device includes non-transitory memory storing instructions executable to control an autonomous driving; and a processor configured to execute the instructions to determine whether a collision has occurred using an acceleration sensor mounted on an airbag control unit during the autonomous driving, determine a collision direction based on a change in acceleration of three axes obtained by the acceleration sensor, and perform an emergency action by controlling at least one of longitudinal direction travel or transverse direction travel based on the collision direction.

12 Claims, 3 Drawing Sheets

(51) Int. Cl.
*B60R 21/01* (2006.01)
*B60R 21/015* (2006.01)
*B60W 30/08* (2012.01)
*B60W 30/095* (2012.01)
*B60W 60/00* (2020.01)

(52) U.S. Cl.
CPC .... *B60W 30/0953* (2013.01); *B60W 60/0016* (2020.02); *B60R 2021/01013* (2013.01); *B60R 2021/01211* (2013.01); *B60W 2030/082* (2013.01); *B60W 2520/06* (2013.01); *B60W 2520/105* (2013.01)

(58) Field of Classification Search
CPC ....... B60W 30/0953; B60W 2520/125; B60W 2520/06; B60W 2554/802; B60R 21/01504; B60Q 1/46; B60Q 1/507
See application file for complete search history.

(56) References Cited

U.S. PATENT DOCUMENTS

| | | |
|---|---|---|
| 8,930,060 B1 * | 1/2015 | Lu ................. G05D 1/0214 |
| | | 701/25 |
| 10,919,475 B2 | 2/2021 | Panigrahi et al. |
| 10,940,857 B2 * | 3/2021 | Lee ................. B60T 8/17558 |
| 11,450,211 B2 * | 9/2022 | Kim ................. G08G 1/167 |
| 2005/0087381 A1 | 4/2005 | Tobata |
| 2012/0064865 A1 * | 3/2012 | Choi ................. H04W 4/029 |
| | | 455/414.1 |
| 2013/0253792 A1 | 9/2013 | Hammoud et al. |
| 2014/0195070 A1 | 7/2014 | Shimizu et al. |
| 2014/0222306 A1 | 8/2014 | Wanami |
| 2016/0325741 A1 | 11/2016 | Furst |
| 2018/0052463 A1 * | 2/2018 | Mays ................. G07C 5/0808 |
| 2018/0102001 A1 * | 4/2018 | Faust ................. B60R 21/0132 |
| 2019/0026874 A1 | 1/2019 | Jin et al. |
| 2019/0232954 A1 | 8/2019 | Cinpinski et al. |

* cited by examiner

DEVICE AND METHOD FOR CONTROLLING AUTONOMOUS DRIVING

CROSS-REFERENCE TO RELATED APPLICATION

This application claims the priority to and the benefit of Korean Patent Application No. 10-2020-0093290, filed on Jul. 27, 2020, the entire contents of which are incorporated herein by reference.

TECHNICAL FIELD

The present disclosure relates to a device and a method for controlling autonomous driving.

BACKGROUND

An autonomous vehicle refers to a vehicle that may recognize a travel environment to determine a risk and plan a travel route to travel by itself without manipulation of a driver. Levels of automation of such autonomous vehicle include six levels from a level 0 to a level 5 based on a guideline (J3016) proposed by the society of automotive engineers (SAE).

Recently, automobile manufacturers are releasing vehicles equipped with an autonomous driving function of the level 2, and are continuing their efforts to implement an autonomous vehicle of the level 3 that may perform autonomous driving in a certain road environment such as a highway, a parking lot, and the like. The autonomous vehicle of the level 3 should prevent a predictable collision and should stop when a collision occurs. The autonomous vehicle of the level 3 is able to predict the collision using sensors that recognize an external environment, but is not able to determine whether the actual collision has occurred. Such actual collision may be sensed through an airbag control unit (ACU), but a collision that is not able to be sensed by the sensors recognizing the external environment or by the airbag control unit alone during the autonomous driving may occur.

SUMMARY

An aspect of the present disclosure provides a device and a method for controlling autonomous driving that recognize a vehicle collision using an acceleration sensor mounted in an airbag control unit (ACU) and perform an emergency action based on a collision type.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device includes non-transitory memory storing instructions executable to control an autonomous driving, and a processor configured to execute the instructions to determine whether a collision has occurred using an acceleration sensor mounted on an airbag control unit during the autonomous driving, determine a collision direction based on a change in acceleration of three axes obtained by the acceleration sensor, and perform an emergency action by controlling at least one of longitudinal direction travel and transverse direction travel based on the collision direction.

In one implementation, the processor may determine that the vehicle collision has occurred when at least one of an accident recording signal or an airbag deployment signal is generated from the airbag control unit.

In one implementation, the processor may predict a possibility of collision using sensors mounted on a vehicle when the accident recording signal or the airbag deployment signal is not generated, and determine whether each amount of change in the acceleration of the three axes exceeds a predetermined amount of change for vehicle control when the possibility of collision exists.

In one implementation, the processor may determine whether each amount of change in the acceleration of the three axes exceeds the determined amount of change when the possibility of collision does not exist.

In one implementation, the processor may identify an axis whose amount of change in the acceleration exceeds the predetermined amount of change, and determine the collision direction based on the amount of change in the acceleration of the identified axis.

In one implementation, the processor may immediately transmit a braking command to a brake controller to stop a vehicle when the collision direction is a forward direction.

In one implementation, the processor may identify a distance between a forward vehicle and a vehicle, move the vehicle until acceleration of an x-axis becomes equal to or less than a predetermined reference acceleration, and stop the vehicle when the collision direction is a rearward direction.

In one implementation, the processor may identify vehicles located in a right front direction and a right rear direction, change a lane in a right direction, and stop a vehicle in a safe section when the collision direction is a left direction.

In one implementation, the processor may identify vehicles located in a left front direction and a left rear direction, change a lane in a left direction, and stop a vehicle in a safe section when the collision direction is a right direction.

In one implementation, the processor may operate an emergency flashing indicator when an autonomous driving state is determined to be a collision state.

According to another aspect of the present disclosure, a method for controlling autonomous driving includes determining whether a collision has occurred using an acceleration sensor mounted on an airbag control unit during the autonomous driving, determining a collision direction based on a change in acceleration of three axes obtained by the acceleration sensor, and performing an emergency action by controlling at least one of longitudinal direction travel or transverse direction travel based on the collision direction.

In one implementation, the determining of whether the collision has occurred may include determining that the vehicle collision has occurred when at least one of an accident recording signal or an airbag deployment signal is generated from the airbag control unit.

In one implementation, the determining of whether the collision has occurred may further include predicting a possibility of collision using sensors mounted on a vehicle when the accident recording signal or the airbag deployment signal is not generated, and determining whether each amount of change in the acceleration of the three axes exceeds a predetermined amount of change for vehicle control when the possibility of collision exists.

In one implementation, the determining of whether the collision has occurred may further include determining whether each amount of change in the acceleration of the three axes exceeds the predetermined amount of change when the possibility of collision does not exist.

In one implementation, the determining of the collision direction may include identifying an axis whose amount of change in the acceleration exceeds the predetermined amount of change, and determining the collision direction based on the amount of change in the acceleration of the identified axis.

In one implementation, the performing of the emergency action may include immediately transmitting a braking command to a brake controller to stop a vehicle when the collision direction is a forward direction.

In one implementation, the performing of the emergency action may include identifying a distance between a forward vehicle and a vehicle, moving the vehicle until acceleration of an x-axis becomes equal to or less than a predetermined reference acceleration, and stopping the vehicle when the collision direction is a rearward direction.

In one implementation, the performing of the emergency action may include identifying vehicles located in a right front direction and a right rear direction, changing a lane in a right direction, and stopping a vehicle in a safe section when the collision direction is a left direction.

In one implementation, the performing of the emergency action may include identifying vehicles located in a left front direction and a left rear direction, changing a lane in a left direction, and stopping a vehicle in a safe section when the collision direction is a right direction.

In one implementation, the performing of the emergency action may include operating an emergency flashing indicator when an autonomous driving state is determined to be a collision state.

DRAWINGS

In order that the disclosure may be well understood, there will now be described various forms thereof, given by way of example, reference being made to the accompanying drawings, in which.

DETAILED DESCRIPTION

Figure 1:
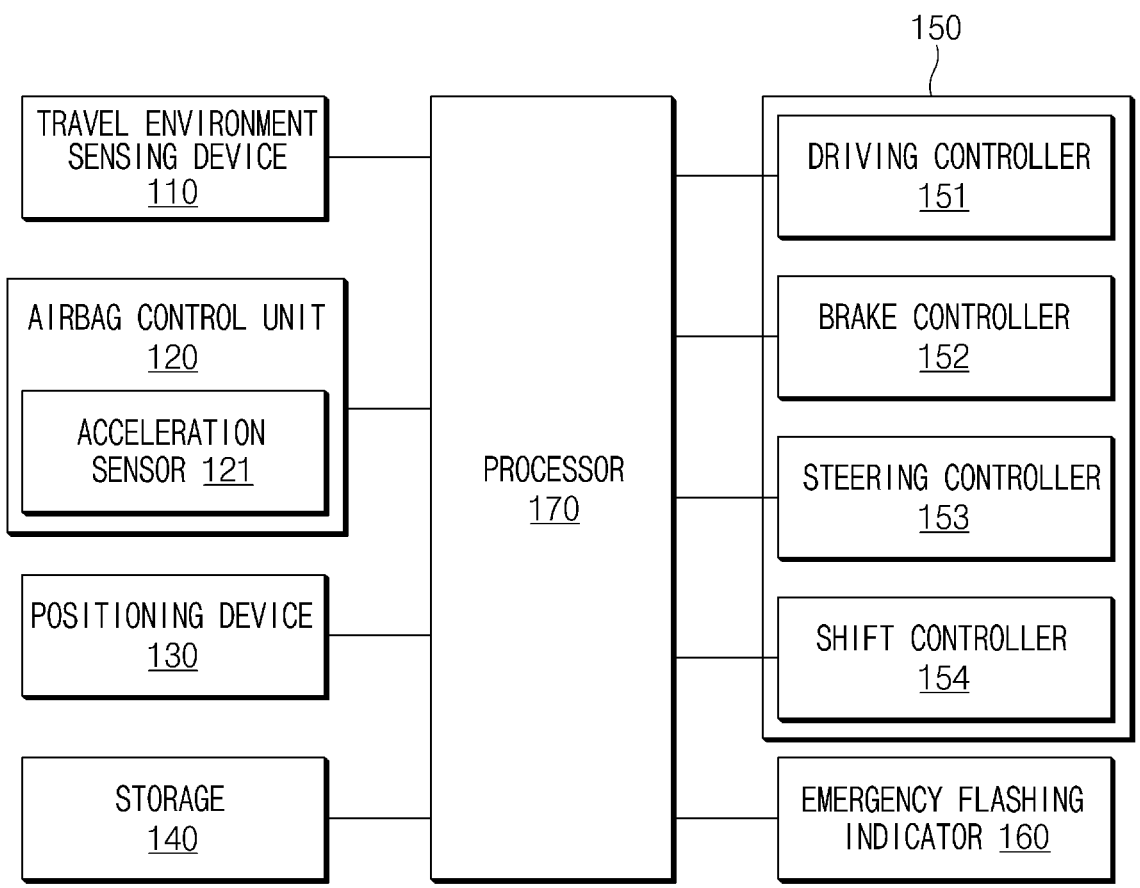
FIG. 1 is a block diagram of a device for controlling autonomous driving in one form of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present specification presents a technology of sensing a collision that is not able to be sensed by sensors recognizing an external environment or by an airbag control unit (ACU) alone using an acceleration sensor mounted on the airbag control unit during autonomous driving of a vehicle and performing an emergency action based on a sensed collision location (a collision direction).

In the present specification, a three-dimensional coordinate system of the vehicle defines a center of gravity of the vehicle as an origin, and defines a length direction of the vehicle, a width direction of the vehicle, and a direction perpendicular to the origin respectively as an x-axis, a y-axis, and a z-axis.

FIG. 1 is a block diagram of a device for controlling autonomous driving in some forms of the present disclosure.

Referring to FIG. 1, an autonomous driving control device 100 may be mounted on a vehicle with a level of automation of a level 3 based on the society of automotive engineers (SAE). The autonomous driving control device 100 includes a travel environment sensing device 110, an airbag control unit 120, a positioning device 130, a storage 140, a vehicle controller 150, an emergency flashing indicator 160, and a processor 170.

The travel environment sensing device 110 detects information on a travel environment exterior of the vehicle while the vehicle is traveling. The travel environment sensing device 110 may acquire the travel environment information (external environment information) through various sensors such as a camera, a radio detecting and ranging (radar), a light detection and ranging (LiDAR), an ultrasonic sensor, and the like.

The airbag control unit 120 controls airbag deployment when a vehicle collision occurs. The airbag control unit 120 may sense the collision using an acceleration sensor 121 mounted therein. In this connection, the acceleration sensor 121 may measure acceleration in three axes, that is, the x-axis, the y-axis, and the z-axis. The airbag control unit 120 may determine whether to deploy the airbag based on a sensor value (a measured value and acceleration of 3 axes) measured by the acceleration sensor 121. The airbag control unit 120 determines to deploy the airbag when the measured sensor value (the measured acceleration) exceeds a threshold value, and determines not to deploy the airbag when the measured sensor value is equal to or less than the threshold value. The airbag control unit 120 may determine a collision type based on a location where the collision has occurred (a collision direction) when sensing the collision. The collision types may include a front surface collision, a rear surface collision, a left surface collision, a right surface collision, and the like. In the present embodiment, a known collision location determination technology is used, so that a detailed description thereof will be omitted.

The airbag control unit 120 outputs an event data recorder (EDR) signal and/or an airbag deployment signal when the collision is sensed. In this connection, the EDR signal is a signal indicating accident information recording, that is, an accident recording signal, and the airbag deployment signal is a signal indicating the airbag deployment. For example, the airbag control unit 120 may generate the accident recording signal when an amount of impact resulted from the collision is equal to or less than a threshold value, and generate the accident recording signal and the airbag deployment signal when the amount of impact exceeds the threshold value.

The positioning device 130 measures a current location of the vehicle. The positioning device 130 may measure a vehicle location using at least one of positioning technologies such as a global positioning system (GPS), a dead reckoning (DR), a differential GPS (DGPS), a carrier phase differential GPS (CDGPS), and the like.

The storage 140 may store instructions executed by the processor 170. The storage 140 may store map data and various setting information. In addition, the storage 140 may store a collision prediction logic, a 3-axis collision determination logic, an autonomous driving state determination logic, a longitudinal direction travel control logic, a transverse direction travel control logic, and the like. Each logic may be executed by the processor 170.

The storage 140 may be implemented as at least one storage medium (recording medium) among storage media of a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, web storage, and the like.

The vehicle controller 150 controls steering, acceleration, and/or braking of the vehicle in response to a command transmitted from the processor 170. The vehicle controller 150 includes a driving controller 151, a brake controller 152, a steering controller 153, and a shift controller 154.

The driving controller 151 is a device that controls a powerplant (e.g., an engine and a driving motor) of the vehicle, which controls the acceleration of the vehicle. The driving controller 151 is implemented as an engine management system (EMS) and/or a motor control unit (MCU). The driving controller 151 controls a driving torque of the engine and/or the driving motor based on accelerator pedal position information. In addition, the driving controller 151 controls an output torque of the engine and/or the driving motor to follow a target driving torque requested from the processor 170.

The brake controller 152 controls deceleration of the vehicle, which may be implemented as an electronic stability control (ESC). The brake controller 152 may control a braking pressure based on a brake pedal position or may control the braking pressure in response to a command from the processor 170.

The steering controller 153 controls the steering of the vehicle, which may be implemented as a motor drive power steering (MDPS). The steering controller 153 controls a steering angle of the vehicle in response to steering wheel manipulation of a driver or a command from the processor 170.

The shift controller 154 controls an overall operation of a transmission (a shift). The shift controller 154 determines an optimal shift stage based on information such as a travel speed of the vehicle, the accelerator pedal position, an engine rotation speed and/or a clutch stroke. The shift controller 154 may be implemented as an electronic shifter or an electric shifter (shift by wire, SBW).

The emergency flashing indicator 160 is operated in response to an instruction from the processor 170. The emergency flashing indicator 160 may be composed of a plurality of flashing lights respectively installed on a front surface, a rear surface, and left and right surfaces of the vehicle. The plurality of flashing lights may be operated at the same time and may be implemented as a light emitting diode (LED), a lamp, or the like.

The processor 170 controls an overall operation of the vehicle. The processor 170 may be implemented as at least one of an application specific integrated circuit (ASIC), a digital signal processor (DSP), a programmable logic device (PLD), a field programmable gate array (FPGA), a central processing unit (CPU), a microcontroller, and a microprocessor.

When a destination is set, the processor 170 controls the vehicle controller 150 based on the travel environment information obtained by the travel environment sensing device 110 to start the autonomous driving. In this connection, the processor 170 may identify a vehicle state through communication with the vehicle controller 150 during the autonomous driving control and reflect the vehicle state in vehicle control.

When at least one of the EDR signal (the accident recording signal) and the airbag deployment signal is generated from the airbag control unit 120 during the autonomous driving, the processor 170 may determine that the vehicle collision has occurred. In this connection, the airbag control unit 120 may sense whether the collision has occurred through the acceleration sensor 121, and output the EDR signal and/or the airbag deployment signal when sensing the collision. In addition, the processor 170 may use the acceleration measured by the acceleration sensor 121 mounted on the airbag control unit 120 when determining the vehicle collision.

When the vehicle collision is sensed, the processor 170 may determine the direction in which the collision has occurred (the collision direction and the collision location). When the airbag deployment signal is generated, the processor 170 may determine the collision direction based on the collision type determined by the airbag control unit 120. For example, when the collision type determined by the airbag control unit 120 is the front surface collision, the processor 170 may determine the collision direction as a forward direction (the front surface). In addition, when the EDR signal is generated, the processor 170 may determine the collision direction based on a change in the acceleration of the 3 axes measured by the acceleration sensor 121 of the airbag control unit 120. The processor 170 may determine an axis (a collision occurred axis) where the change in the acceleration of the 3 axes exceeding a reference value has occurred, and determine the collision direction based on the collision occurred axis and an amount of change in the acceleration of the corresponding axis. When the EDR signal and the airbag deployment signal are generated at the same time, the processor 170 prioritizes and processes the airbag deployment signal over the EDR signal. For example, when the EDR signal and the airbag deployment signal are generated at the same time, the processor 170 may determine the collision direction based on the collision type determined by the airbag control unit 120.

When sensing that the vehicle collision has not occurred, the processor 170 may use the travel environment sensing device 110 to predict a possibility of collision of the vehicle. In other words, when the EDR signal and the airbag deployment signal are not generated in the airbag control unit 120, the processor 170 may determine whether there is the possibility of collision based on the travel environment information obtained by the travel environment sensing device 110.

When there is the possibility of collision, the processor 170 determines whether amounts of change in the acceleration of the 3 axes of the vehicle exceed an instructed amount of change. In other words, when the vehicle collision is predicted, the processor 170 measures an amount of change in the acceleration of each of the x-axis, the y-axis, and the z-axis through the acceleration sensor 121. The processor 170 determines whether the amount of change in the acceleration of each axis exceeds the instructed amount of change (a commanded value) of the corresponding axis transmitted to the vehicle controller 150 for the autonomous driving control. The processor 170 may determine the collision direction based on an axis (the collision occurred axis) where the change in the acceleration exceeds the instructed amount of change and the amount of change in the acceleration of the corresponding axis. In this connection, the processor 170 determines that vehicle collision has occurred when an amount of change in the acceleration of at least one axis exceeds the instructed amount of change of the corresponding axis. On the other hand, when the amounts of change in the acceleration of all the axes are respectively equal to or less than the instructed amounts of change of the corresponding axes, the processor 170 determines that the vehicle collision has not occurred. For example, in a situation in which the processor 170 has transmitted the instructed amounts of change of 5 km/s$^2$, 2 km/s$^2$, and 0 km/s$^2$ for the respective x-axis, y-axis, and z-axis to the vehicle controller 150, when the amounts of change in the acceleration of the x-axis, the y-axis, and the z-axis are respectively measured as 8 km/s$^2$, 2 km/s$^2$, and 0 km/s$^2$ by the acceleration sensor 121, the processor 170 may determine that the rear surface collision (an x-axis collision) has occurred.

When there is no possibility of collision, the processor 170 determines whether the amounts of change in the acceleration of the 3 axes of the vehicle exceed a predetermined reference amount of change. In other words, the processor 170 measures the amount of change in the acceleration of each of the x-axis, the y-axis, and the z-axis through the acceleration sensor 121 when the vehicle collision is not predicted. When the amount of change in the acceleration of each axis exceeds the reference amount of change, the processor 170 determines that the vehicle collision has occurred. On the other hand, when the amounts of change in the acceleration of all the axes are equal to or less than the reference amount of change, the processor 170 may determine that the vehicle collision has not occurred. The processor 170 may identify an axis (the collision occurred axis) where the change in the acceleration that exceeds the reference amount of change has occurred, and determine the collision direction based on the identified axis and the amount of change in the acceleration of the corresponding axis. In the present embodiment, determining whether the collision has occurred based on the reference amount of change previously set by a system designer has described as an example, but the present disclosure may be implemented to use a target control value of the vehicle as a criterion for determining whether the collision has occurred.

When the collision direction is determined in a collision situation, the processor 170 may perform the emergency action based on the determined collision direction. When the collision direction (the collision location) is the forward direction (the front surface), the processor 170 may immediately transmit a braking command to the brake controller 152 to stop the vehicle. When the collision direction is a rearward direction (the rear surface), the processor 170 moves the vehicle until the acceleration of the x-axis becomes equal to or less than a predetermined reference acceleration, and then transmits the braking command to the brake controller 152 to stop the vehicle. The processor 170 identifies a distance between a forward vehicle and the vehicle, then moves the vehicle until the acceleration of the x-axis is stabilized when the vehicle is able to be moved, and then stops the vehicle. When the collision direction is a left direction (the left surface), the processor 170 transmits a steering control command to the steering controller 153 with the goal of the vehicle stop on a right side of a travel lane. The processor 170 identifies vehicles located in a right front direction and a right rear direction, then changes the lane when the lane change is possible, and then stops the vehicle in a safe section (e.g., a shoulder and the like). When the collision direction is a right direction (the right surface), the processor 170 transmits the steering control command to the steering controller 153 with the goal of the vehicle stop on a left side of the travel lane. The processor 170 identifies vehicles located in a left front direction and a left rear direction, then changes the lane when the lane change is possible, and then stops the vehicle in the safe section. The processor 170 may control an operation of the emergency flashing indicator 160 after preferentially flashing a turn indicator when changing the lane.

The processor 170 operates the emergency flashing indicator 160 when an autonomous driving state is identified as a collision state. The processor 170 does not operate the emergency flashing indicator 160 when the autonomous driving state is identified as a non-collision state.

Figure 2:
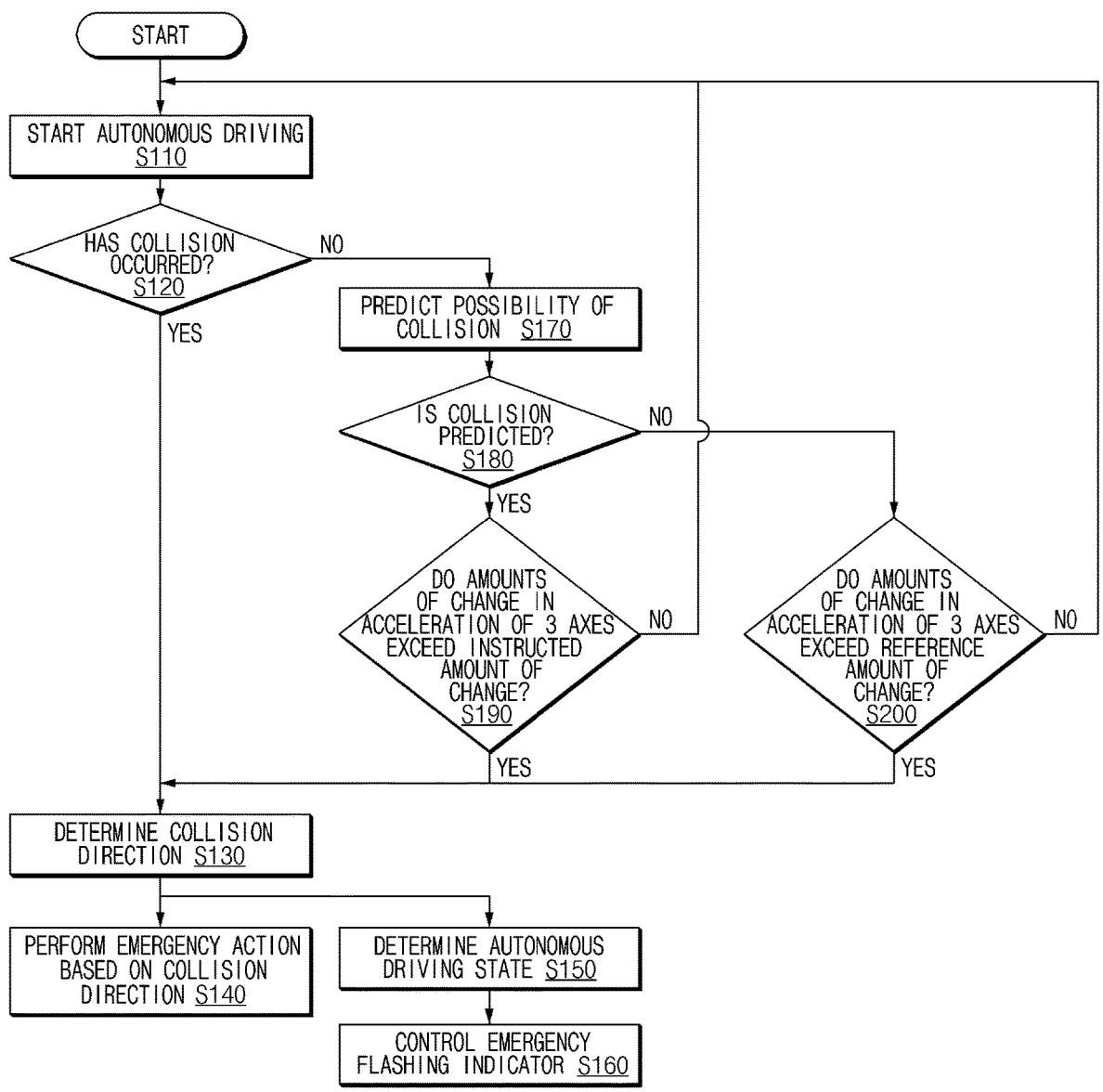
FIG. 2 is a flowchart illustrating a method for controlling autonomous driving in one form of the present disclosure.

FIG. 2 is a flowchart illustrating a method for controlling autonomous driving in some forms of the present disclosure.

Referring to FIG. 2, when the destination is set, the processor 170 starts the autonomous driving (S110). The processor 170 controls the vehicle controller 150 based on the travel environment information obtained by the travel environment sensing device 110 to control the autonomous driving.

The processor 170 determines whether the vehicle collision has occurred based on the signal generated from the airbag control unit 120 during the autonomous driving (S120). When the at least one of the EDR signal and the airbag deployment signal is generated from the airbag control unit 120, the processor 170 may determine that the vehicle collision has occurred.

When determining that the vehicle collision has occurred, the processor 170 determines the collision direction using the airbag control unit 120 or the acceleration sensor 121 (S130). When the airbag deployment signal is generated, the processor 170 may determine the collision direction based on the collision type determined by the airbag control unit 120. In addition, when the EDR signal is generated, the processor 170 may determine the collision direction by identifying the axis where the change in the acceleration has occurred using the acceleration sensor 121.

The processor 170 performs travel control based on the collision direction (S140). When the collision direction is the forward direction, the processor 170 immediately transmits the braking command to the brake controller 152 to stop the vehicle. When the collision direction is the rearward direction, the processor 170 transmits the braking command to the brake controller 152 to stop the vehicle when the acceleration of the x-axis becomes equal to or less than the predetermined reference acceleration. The processor 170 identifies the distance between the forward vehicle and the vehicle, then moves the vehicle until the acceleration of the x-axis is stabilized when the vehicle is able to be moved, and then stops the vehicle. When the collision direction is the left direction, the processor 170 transmits the steering control command to the steering controller 153 with the goal of the vehicle stop on the right side of the travel lane. The processor 170 identifies the vehicles located in the right front direction and the right rear direction, then changes the lane when the lane change is possible, and then stops the vehicle in the safe section (e.g., the shoulder and the like). When the collision direction is the right direction, the processor 170 transmits the steering control command to the steering controller 153 with the goal of the vehicle stop on the left side of the travel lane. The processor 170 identifies the vehicles located in the left front direction and the left rear direction, then changes the lane when the lane change is possible, and then stops the vehicle in the safe section. The processor 170 may control the operation of the emergency flashing indicator 160 after preferentially flashing the turn indicator when changing the lane.

The processor 170 determines the autonomous driving state (S150). The processor 170 determines whether the autonomous driving state is the collision state.

The processor 170 controls the emergency flashing indicator 160 based on the autonomous driving state (S160). The processor 170 operates the emergency flashing indicator 160 when the autonomous driving state is the collision state. The processor 170 does not operate the emergency flashing indicator 160 when the autonomous driving state is not the collision state.

When it is determined in S120 that the vehicle collision has not occurred, the processor 170 predicts the possibility of collision based on the travel environment information (S170). The processor 170 may determine whether there is the possibility of collision using a known collision prediction technology.

The processor 170 determines whether there is the possibility of collision based on a possibility of collision prediction result (S180).

When the vehicle collision is predicted, the processor 170 determines whether the amounts of change in the acceleration of the 3 axes exceed the instructed amount of change (S190). The processor 170 measures the amount of change in the acceleration of each of the x-axis, the y-axis, and the z-axis through the acceleration sensor 121 when there is the possibility of collision. The processor 170 determines whether the measured amount of change in the acceleration of each axis exceeds the instructed amount of change (the commanded value) transmitted for longitudinal direction and/or transverse direction travel control of the vehicle. The processor 170 may determine that the vehicle collision has occurred when the amount of change in the acceleration of the 3 axes exceeds the instructed amount of change. When the amount of change in the acceleration of the 3 axes is equal to or less than the instructed amount of change, the processor 170 may determine that the vehicle collision has not occurred.

When the collision is not predicted in S180, that is, when there is no possibility of collision, the processor 170 determines whether the amounts of change in the acceleration of the 3 axes exceed the reference amount of change (S200). The processor 170 measures the amount of change in the acceleration of each of the x-axis, the y-axis, and the z-axis through the acceleration sensor 121 to determine whether the amount of change in the acceleration of each of the x-axis, the y-axis, and the z-axis exceeds the reference amount of change. When the amount of change in the acceleration of the 3 axes exceeds the reference amount of change, the processor 170 may determine that the vehicle collision has occurred. When the amount of change in the acceleration of the 3 axes is equal to or less than the reference amount of change, the processor 170 may determine that the vehicle collision has not occurred.

Thereafter, when the amount of change in the acceleration of the 3 axes exceeds the instructed amount of change in S190 or when the amount of change in the acceleration of the 3 axes exceeds the reference amount of change in S200, the processor 170 performs S130 to S160. The processor 170 may detect the axis where the amount of change in the acceleration exceeds the instructed amount of change or the reference amount of change as the collision occurred axis, and determine the collision direction based on the collision occurred axis and/or the amount of change in the acceleration of the corresponding axis. The processor 170 may establish an emergency action strategy such that the vehicle may perform an emergency stop at a safe place by controlling at least one of the longitudinal direction travel and the transverse direction travel of the vehicle based on the determined collision direction. Further, the processor 170 may operate the emergency flashing indicator 160 when the vehicle collision is sensed.

Figure 3:
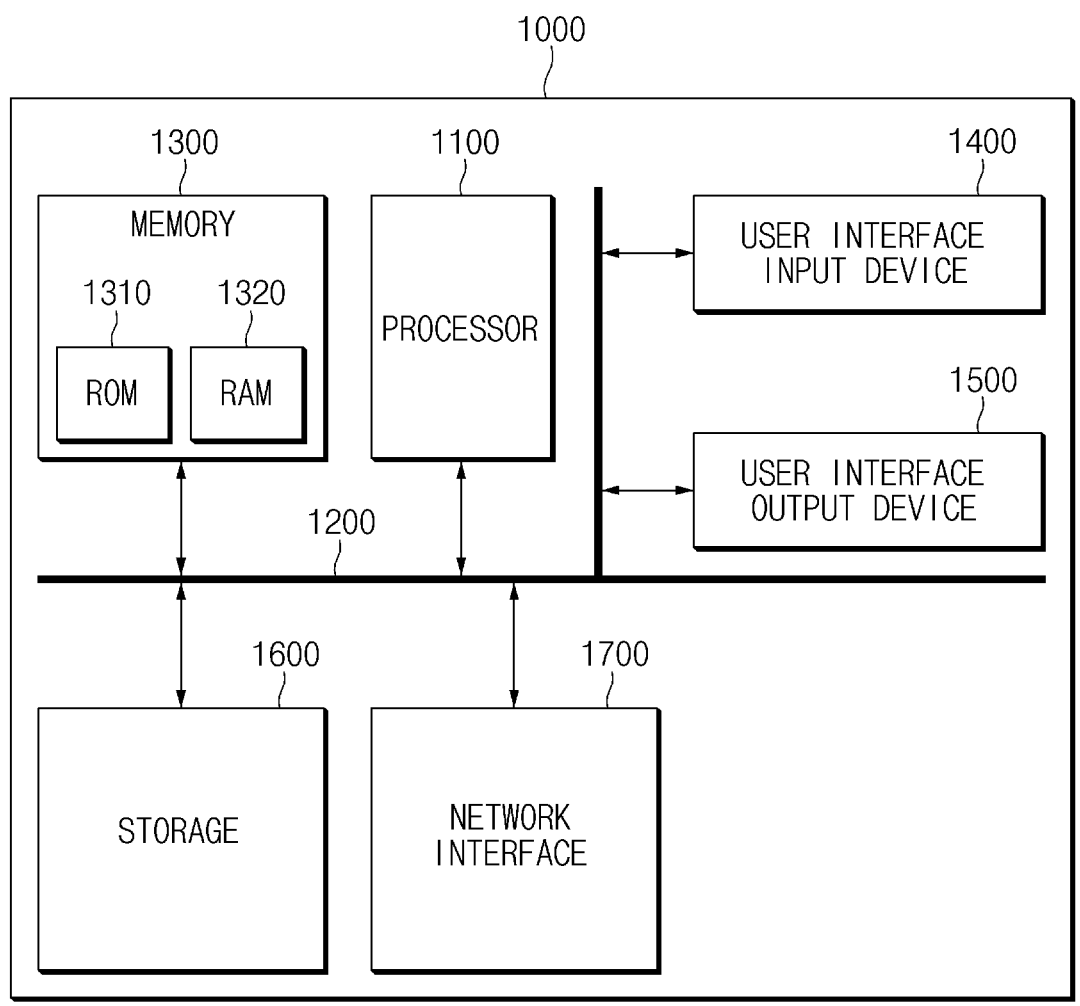
FIG. 3 is a block diagram showing a computing system that executes a method for controlling autonomous driving in one form of the present disclosure.

FIG. 3 is a block diagram showing a computing system that executes a method for controlling autonomous driving in some forms of the present disclosure.

Referring to FIG. 3, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, the collision that is not able to be sensed by the sensors recognizing the external environment or by the airbag control unit (ACU) alone may be sensed using the acceleration sensor mounted on the airbag control unit during the autonomous driving of the vehicle.

In addition, according to the present disclosure, the emergency stop of the vehicle may be more safely performed by establishing a transverse direction and/or longitudinal direction travel control strategy based on the collision location (the collision direction).

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device comprising:
non-transitory memory storing instructions executable to control an autonomous driving of a vehicle; and
a processor configured to execute the instructions to:
determine whether a collision has occurred to the vehicle using an acceleration sensor mounted on an airbag control unit during the autonomous driving;
determine a collision direction based on a change in acceleration of three axes obtained by the acceleration sensor; and
perform an emergency action by controlling at least one of longitudinal direction travel or latitudinal direction travel based on the collision direction, wherein the processor is further configured to:
when the collision direction is a forward direction, immediately transmit a braking command to a brake controller to stop the vehicle,
when the collision direction is a rearward direction, move the vehicle until an acceleration of an x-axis becomes equal to or less than a predetermined reference acceleration, and transmit the braking command to the brake controller to stop the vehicle,
when the collision direction is a left direction, transmit a steering control command to a steering controller to stop the vehicle on a right side of a travel lane, and
when the collision direction is a right direction, transmit the steering control command to the steering controller to stop the vehicle on a left side of the travel lane.

2. The device of claim 1, wherein the processor is further configured to:
conclude that the collision of a vehicle has occurred when at least one of an accident recording signal or an airbag deployment signal is generated from the airbag control unit.

3. The device of claim 2, wherein the processor is further configured to:
predict a possibility of the collision using sensors mounted on the vehicle when the accident recording signal or the airbag deployment signal is not generated; and
determine whether each amount of change in the acceleration of the three axes exceeds a predetermined amount of change for vehicle control when the possibility of collision exists.

4. The device of claim 3, wherein the processor is further configured to:
determine whether each amount of change in the acceleration of the three axes exceeds the predetermined amount of change when the possibility of the collision does not exist.

5. The device of claim 4, wherein the processor is further configured to:
identify an axis whose amount of change in the acceleration exceeds the predetermined amount of change; and
determine the collision direction based on the amount of change in the acceleration of the identified axis.

6. The device of claim 1, wherein the processor is further configured to:
operate an emergency flashing indicator when an autonomous driving state is determined to be a collision state.

7. A method for controlling autonomous driving, the method comprising:
determining whether a collision has occurred to a vehicle using an acceleration sensor mounted on an airbag control unit during the autonomous driving of the vehicle;
determining a collision direction based on a change in acceleration of three axes obtained by the acceleration sensor; and
performing an emergency action by controlling at least one of longitudinal direction travel or latitudinal direction travel based on the collision direction,
wherein the performing of the emergency action includes:
when the collision direction is a forward direction, immediately transmitting a braking command to a brake controller to stop the vehicle,
when the collision direction is a rearward direction, moving the vehicle until an acceleration of an x-axis becomes equal to or less than a predetermined reference acceleration, and transmitting the braking command to the brake controller to stop the vehicle,
when the collision direction is a left direction, transmitting a steering control command to a steering controller with to stop the vehicle on a right side of a travel lane, and
when the collision direction is a right direction, transmitting the steering control command to the steering controller to stop the vehicle on a left side of the travel lane.

8. The method of claim 7, wherein the determining of whether the collision has occurred includes:
concluding that the collision of the vehicle has occurred when at least one of an accident recording signal or an airbag deployment signal is generated from the airbag control unit.

9. The method of claim 8, wherein the determining of whether the collision has occurred further includes:
predicting a possibility of the collision using sensors mounted on the vehicle when the accident recording signal or the airbag deployment signal is not generated; and
determining whether each amount of change in the acceleration of the three axes exceeds a predetermined amount of change for vehicle control when the possibility of the collision exists.

10. The method of claim 9, wherein the determining of whether the collision has occurred further includes:
determining whether each amount of change in the acceleration of the three axes exceeds the predetermined amount of change when the possibility of the collision does not exist.

11. The method of claim 10, wherein the determining of the collision direction includes:
    identifying an axis whose amount of change in the acceleration exceeds the predetermined amount of change; and
    determining the collision direction based on the amount of change in the acceleration of the identified axis.

12. The method of claim 7, wherein the performing of the emergency action includes:
    operating an emergency flashing indicator when an autonomous driving state is determined to be a collision state.

\* \* \* \* \*